(12) United States Patent
Baytekin-Gerngross et al.

(10) Patent No.: US 11,085,117 B2
(45) Date of Patent: Aug. 10, 2021

(54) METHOD FOR ETCHING THE SURFACE OF ALUMINUM FRAGMENTS, ALUMINUM FRAGMENTS WITH AN ETCHED SURFACE AND MATERIAL COMPOSITES CONTAINING SUCH FRAGMENTS

(71) Applicant: Christian-Albrechts-Universitaet zu Kiel, Kiel (DE)

(72) Inventors: Melike Baytekin-Gerngross, Kiel (DE); Mark-Daniel Gerngross, Kiel (DE); Juergen Carstensen, Kiel (DE); Rainer Adelung, Kiel (DE)

(73) Assignee: Christian-Albrechts-Universitaet zu Kiel, Kiel (DE)

( * ) Notice: Subject to any disclaimer, the term of this patent is extended or adjusted under 35 U.S.C. 154(b) by 107 days.

(21) Appl. No.: 16/077,436

(22) PCT Filed: Jan. 9, 2017

(86) PCT No.: PCT/DE2017/100011
§ 371 (c)(1),
(2) Date: Aug. 10, 2018

(87) PCT Pub. No.: WO2017/137028
PCT Pub. Date: Aug. 17, 2017

(65) Prior Publication Data
US 2019/0040532 A1    Feb. 7, 2019

(30) Foreign Application Priority Data
Feb. 11, 2016   (DE) ............... 10 2016 102 379.5

(51) Int. Cl.
*C23F 1/20*    (2006.01)
*C09C 1/64*    (2006.01)
(Continued)

(52) U.S. Cl.
CPC .............. *C23F 1/20* (2013.01); *C08K 3/08* (2013.01); *C09C 1/64* (2013.01); *H01B 1/023* (2013.01); *C08K 2003/0812* (2013.01)

(58) Field of Classification Search
CPC ..... C23F 1/20; C08K 3/08; C08K 2003/0812; C09C 1/64; H01B 1/023
(Continued)

(56) References Cited

U.S. PATENT DOCUMENTS 2,944,917 A    7/1960   Cane
2013/0264196 A1    10/2013   Hemphill et al.

FOREIGN PATENT DOCUMENTS

EP    2298525 A1    3/2011
GB    791653 A    3/1958
(Continued)

OTHER PUBLICATIONS

WO 2012161183 A1, machine translation, Google Patents. (Year: 2010).*
(Continued)

Primary Examiner — Josephine L Chang
(74) Attorney, Agent, or Firm — Patent Central LLC; Stephan A. Pendorf (57) ABSTRACT

A method for etching fragments of aluminum or an aluminum alloy comprising the steps of: a. providing a hydrochloric acid solution in a trough-shaped container; b. inoculating the hydrochloric acid solution by chemically dissolving an amount of aluminum to produce an etching solution; c. adding the fragments to the etching solution immediately after the inoculation; d. etching the fragments for 0.5 to 10 minutes while stirring in such a way that the fragments are entrained by the motion of the etching solution; e. stopping the etching by diluting the etching solution with water; f. removing the etched fragments; g. repeatedly
(Continued)

rinsing the fragments with water and h. rinsing the fragments with an organic desiccant. An etched fragment of aluminum or an aluminum alloy and also to a composite material comprising etched fragments.

7 Claims, 7 Drawing Sheets

(51) Int. Cl.
    *C08K 3/08*     (2006.01)
    *H01B 1/02*     (2006.01)
(58) Field of Classification Search
    USPC .......................................................... 524/441
    See application file for complete search history.

(56) References Cited

FOREIGN PATENT DOCUMENTS

| | | |
|---|---|---|
| WO | 2010076892 A1 | 7/2010 |
| WO | 2012161183 A1 | 11/2012 |

OTHER PUBLICATIONS

WO 2010076892 A1, machine translation, Google Patents. (Year: 2012).*
International Search Report dated May 9, 2018, in International Application No. PCT/DE2017/100011.

* cited by examiner

METHOD FOR ETCHING THE SURFACE OF ALUMINUM FRAGMENTS, ALUMINUM FRAGMENTS WITH AN ETCHED SURFACE AND MATERIAL COMPOSITES CONTAINING SUCH FRAGMENTS

The invention relates to a wet-chemical etching method for fragments of aluminum and aluminum alloys. The invention also relates to fragments made of aluminum or an aluminum alloy, which can be produced by the etching method, as well as material composites containing these fragments.

A composite material in the sense of this description is a solid material, which is formed from at least one initially flowable and thereafter cured material phase, which is contacted in the flowable state with the aluminum fragments, generally mixed. The curing of the initially flowable material phase can be carried out, for example, by thermal setting or by polymerization or by chemical reaction, i.e., chemical oxidation or reduction of at least one constituent of the initially flowable material phase, optionally with expulsion of solvents, or by a combination of such processes. The initially flowable material phase can be, for example, a polymer melt, a monomer or polymer solution, a sol-gel solution or else a suspension of particles which, after deposition from the suspension—for example by drying—can be thermally melted into a composite.

By a fragment, the present description means an object of any shape having a volume smaller than 1 cubic centimeter, typically smaller than 100 cubic millimeters, preferably in the range 0.1 to 1 cubic millimeter, with the constraint that the smallest feature width of the object is greater than 50 microns, typically greater than 200 microns, and is preferably in the range 0.5 to 5 millimeters. Fragments should therefore be material bodies with a predetermined minimum material thickness along all spatial axes. For example, in the case of a cuboid, the shortest edge length is the smallest feature width, and for a wireframe of whatever shape, the smallest feature width is the usual wire diameter. For a fragment in the form of a rotation torus, which is unambiguously described by two radii r, R with r<R, the diameter of the annular bead or ring, 2*r, is the smallest structure width. When the fragment is a wire, the wire preferably has a wire diameter of at least 50 micrometers and a length of at least 0.5 millimeter.

A fragment is usually individually visible to the naked eye. A fragment is expressly not a nanoparticle and generally also can no longer be called a microparticle. Common alternative terms for fragments without precise shape specification in the literature are flakes, scales, nodules or granules for a collection of fragments. The term fragment is sometimes used as a general synonym for fragments.

In this description, the term aluminum fragment is used short-hand as a collective term for fragments consisting of the (almost) pure element metal as well as from the technically common alloys of predominantly aluminum with manganese, magnesium, copper, silicon, nickel, zinc and beryllium. In general, the aluminum fragment is made of solid metal, but it can also be a closed hollow body.

From the prior art, for example from the document U.S. Pat. No. 2,944,917, it is known that the adhesion of polymers, in particular those with low surface energy such as silicone or polytetrafluoroethylene (PTFE), can be significantly improved on surfaces of aluminum and aluminum alloys when the metal is treated for a few minutes with concentrated hydrochloric acid at room temperature. This forms pore structures in the metal, which have undercuts and angled portions. If a polymer in flowable form is brought into contact with the thus etched surface and solidified—for example, in U.S. Pat. No. 2,944,917 an aqueous suspension of PTFE particles which are thermally fused after evaporation of the water—then the polymer can no longer be peeled off the metal even with use of great force.

The reason for the excellent adhesion of initially flowable, hardening material phases to the etched aluminum is a mechanical interlocking in an enlarged layer with anchoring structures along the entire etched area.

For example, from the work of Jin Yang et al., "Superoleophobic textured aluminum surfaces," New J. Chem., 2011, 35, 2422-2426, images of the surface of pure aluminum following an etch attack with hydrochloric acid can be seen in FIGS. 6a and b. Further example images for etched aluminum surfaces with anchoring structures are shown in FIG. 1 in document US 2013/0264196 A1, which is concerned not with the mechanical anchoring, but with the surface area enlargement of aluminum anodes in electrolytic capacitors.

Figure 1:
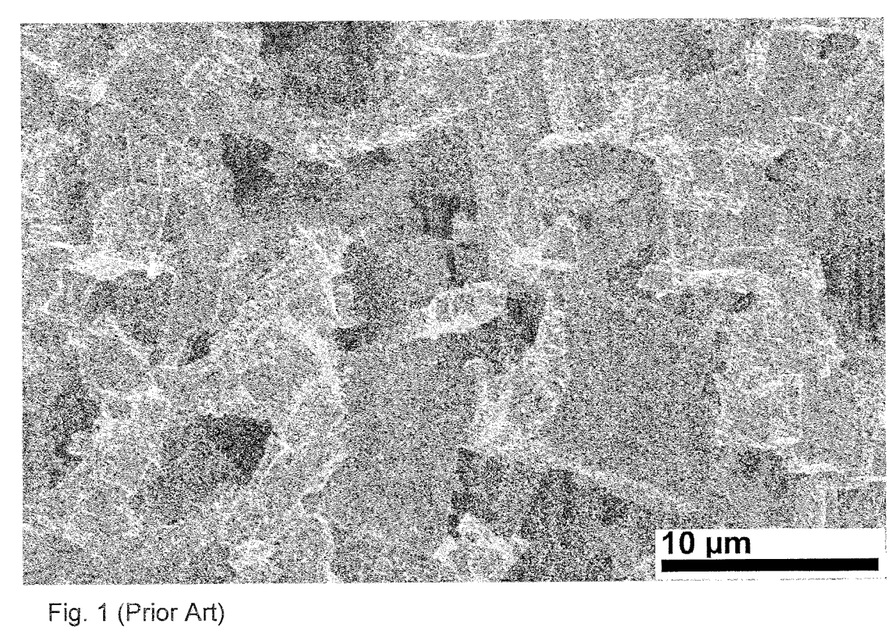
FIG. 1 an etched surface on nearly pure aluminum (Al: about 99.5%, prior art)
Figure 2:
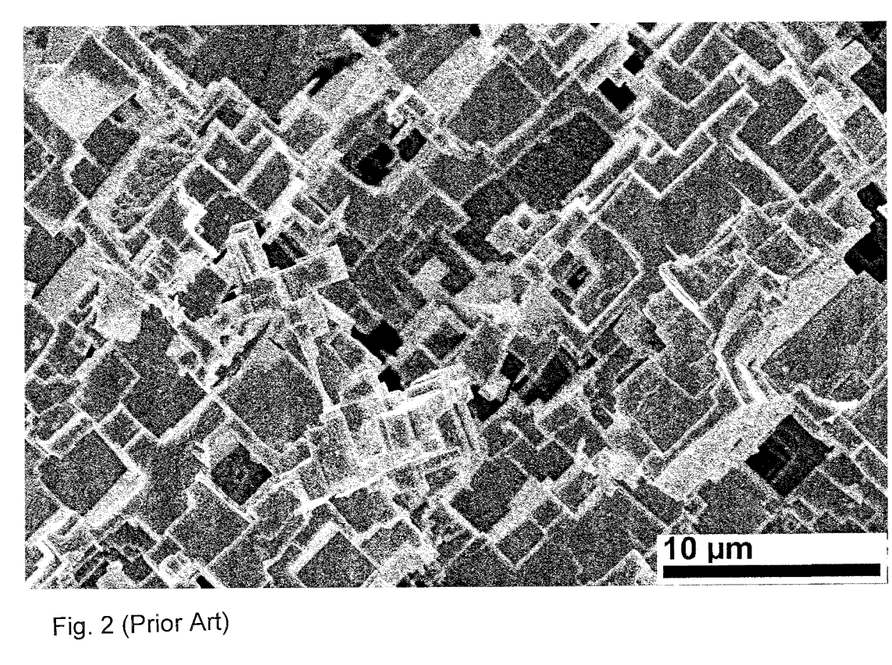
FIG. 2 an etched surface on AlMg3 alloy (prior art)
Figure 3:
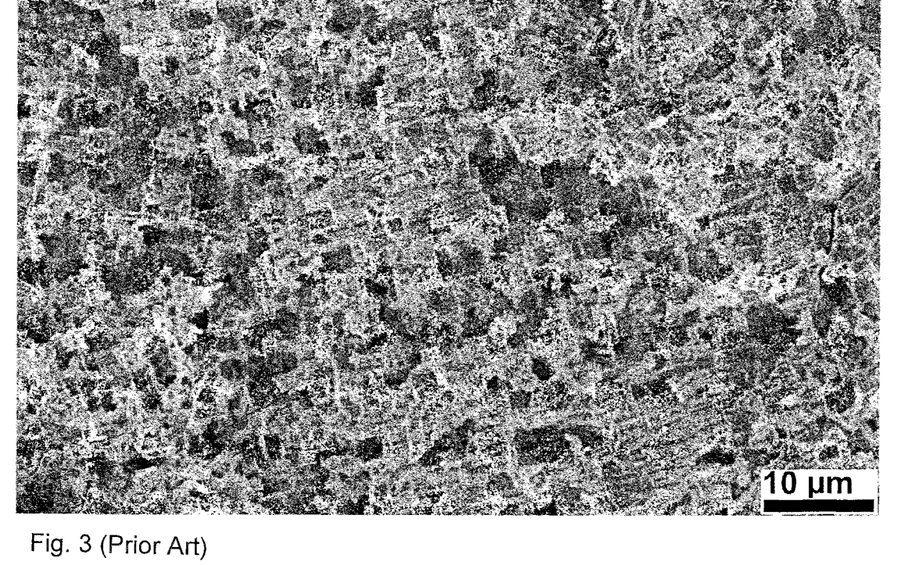
FIG. 3 an etched surface on the alloy AlMgSi0.5 (prior art)
Figure 4:
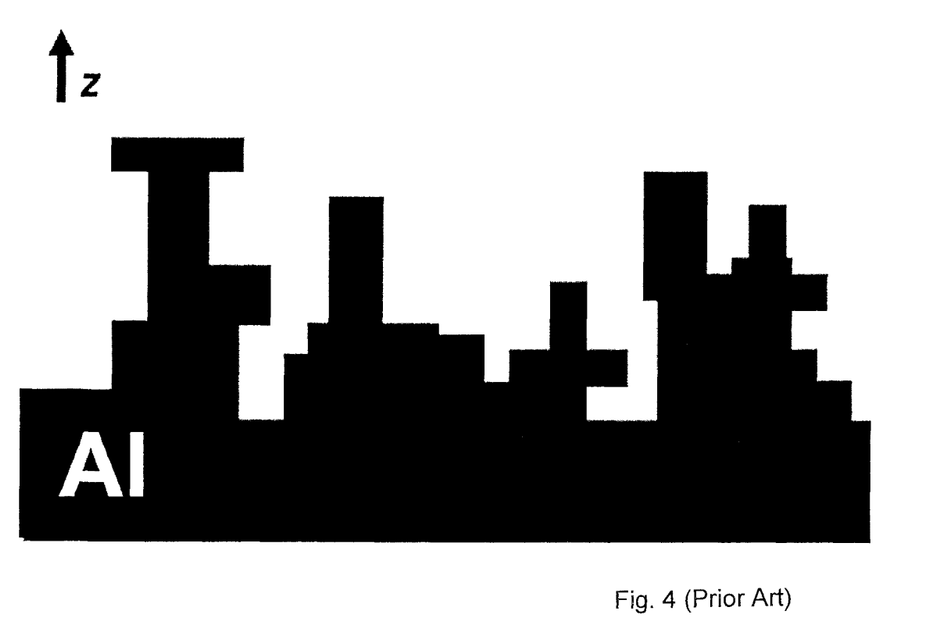
FIG. 4 a schematic sketch of the anchoring structures, along the z-axis perpendicular to the aluminum surface which form by the etching attack (see FIGS. 1 to 3) (prior art)

The structures known from the prior art are also shown in FIGS. 1 to 3 of the present description for illustration for three different aluminum alloys. They are reminiscent of coral and have deep pores, which are surrounded by remaining aluminum struts with jagged columnar form and often covered. FIG. 4 illustrates a schematic cross-section of the anchoring structures achievable by etching, perpendicular to the etched aluminum surface. Because these pillars are sometimes reminiscent of cubes stacked on top of each other, forming a confusing sculpture, the present inventors have given the etching-out of structures from a metal block the term "sculpturing".

A flowable phase, which penetrates into the pores, must at least partially flow around the numerous sculptures and finally keep them enclosed after curing. The apparent high surface density of the enclosures causes the overall improved adhesion of the initially flowable phase to the etched aluminum surface.

The anchoring structures can be produced easily and quickly, typically within minutes, by acid attack on aluminum surfaces. They can then—after a cleaning—be contacted for example with a polymer precursor solution for a silicone or a polyurethane. Own experiments by the inventors have shown that after curing of the polymer any attempt at mechanical separation of polymer and aluminum surface inevitably ends in cohesive failure of the polymer. Adhesion between the materials is irrelevant to such a bond.

To the knowledge of the inventors, no attempt has been made so far to transfer this outstanding anchoring ability of the aluminum to small aluminum bodies. The utilization purpose of such fragments is to produce composites with a high aluminum content and improved electrical and/or mechanical properties.

Aluminum fragments are usually not processed into composites with other materials such as polymers because the fragments are often easily leachable by force and the composites would then tend to structural failure at the extended and often also contiguous polymer-aluminum interfaces. Usually composites are based on the addition of nano- to microparticles, because they can be combined much more robustly with matrix materials.

An interesting exception to this rule can be found in the document GB 791,653. There, a synthetic resin filled with aluminum fragments is presented as a material with increased impact and bending and tensile strength, wherein at least half the aluminum fragments should consist of those with a minimum dimension greater than 0.14 mm. The document assumes without further explanation that synthetic resin and aluminum show good adhesion to each other. However, this is not readily the case for many technically relevant polymers.

It is therefore the object of the invention to propose a method for etching the surface of aluminum fragments, which provides the fragments with anchoring structures. However, the method should not significantly change or remove the smallest structure widths or even completely dissolve the fragments.

It is a further object of the invention to provide composite materials comprising the aluminum fragments provided with anchoring structures having improved mechanical properties.

Another object of the invention should be to show other uses of the modified aluminum fragments in the production of material composites.

The first object is achieved by an etching method for fragments of aluminum or an aluminum alloy with the following steps:
 a. providing a hydrochloric acid solution having a concentration of 1.1 to 4.2 moles HCl per liter of water in a trough- or vat-shaped container;
 b. inoculating the hydrochloric acid solution by chemically dissolving a quantity of aluminum from the interval 0.5 g to 17.5 g per liter to produce an etching solution;
 c. adding the fragments to the etching solution immediately after the inoculation;
 d. etching the fragments for 0.5 to 10 minutes while circulating the etching solution with the fragments such that the fragments are entrained by the movement of the etching solution;
 e. stopping the etching within a few seconds by diluting the etching solution with water;
 f. removing the etched fragments from the etching solution;
 g. repeatedly rinsing of fragments with water immediately after the removal and
 h. rinsing the fragments with an organic desiccant.

The dependent claims indicate advantageous embodiments of the etching method. An ancillary claim is directed to the etched aluminum fragments. Further subclaims relate to composite materials containing the etched aluminum fragments.

It is well known that an aluminum body placed in a concentrated acid, e.g., hydrochloric acid, is first subjected to a gradual, low-reactive etch attack for a few minutes, which then abruptly changes to a violent and exothermic reaction. In the case of the etching of fragments in the context of the present invention, in the case of the occurrence of a violent reaction with the complete dissolution of the fragments, at least the destruction of the smallest structural widths of the fragments is to be expected, so that the etching result is unpredictable.

The vigorous reaction can be prevented by using a low-concentration acid, but the etching method is thereby considerably prolonged, and the etching result is difficult to predict even then. Experiments by the inventors, in which aluminum fragments are placed in a trough- or vat-shaped container with an acidic etching solution, show the following:

The etching starts very inhomogeneously, presumably on slightly corrosive surface areas, recognizable by a beginning increase in roughness, while other areas still appear perfectly smooth. Starting from the areas with increased roughness, the roughness begins to increase also in the neighboring areas (island growth). Only after an etching time of about 10 minutes, an etching takes place on the entire surface. Due to the local increase in roughness at different times, the etching must be continued for approximately another 10 minutes, so that a roughness which is homogeneous over the entire surface is achieved.

If the fragments are subsequently removed from the etching solution, then a faster resolution visible to the eye via blistering begins immediately, i.e. the reaction products formed by the etching lead to a self-reinforcing dissolution. However, this fast resolution reduces the local roughness, thus leading to an excessive electropolishing.

The etching method described so far thus has the disadvantages that on the one hand it runs clearly too slowly and on the other hand shows an inappropriate electropolishing when removing the fragment from the etching bath. Moreover, the etching bath is changed in its composition by the etching method, so that after a holding time a second etching of fragments in the same bath leads to deviating and unpredictable results.

Basically, when etching surfaces a distinction is made between defect and polish etching. Polishing is characterized by a local etch removal that occurs independent of local differences in the electrochemical potential at the interface or local differences in dissolution kinetics. This is often achieved by indirect dissolution, in which, for example, first a metal or a semiconductor is chemically converted into an amorphous oxide and, in a second chemical step, the oxide is dissolved. Both oxide formation and oxide dissolution are less sensitive to local differences, resulting in isotropic polish etching. In contrast, in a defect etching, precisely such electrochemical reactions are used which are sensitive to the differences in the local electrochemical potential or preferentially highlight defect structures via differences in the local reaction kinetics.

The inventors have recognized that for the desired surface structuring of aluminum fragments, both etches must proceed in a favorable relationship to each other. For example, in order to form crystallographic surfaces, an isotropic etch—light polish etching—must take place on the length scale of surface grains, while anisotropy is desired on larger length scales.

According to the invention, a solution of hydrochloric acid "seeded" with aluminum is provided as the etching solution.

According to the invention, the hydrochloric acid solution should have a concentration of between 1.1 and 4.2 moles of HCL per liter of water, whereby, according to experiments by the inventor, lower concentrations do not bring about an acceptable reaction rate and higher concentrations do not bring about a suitable process control. Preferably, the concentration should be chosen between 1.7 and 2.5 mol/l; very particularly preferred is a concentration of about 2.1 mol/l.

The seeding of the hydrochloric acid solution is adapted from silicon chemistry and means enriching the acid with—not long-term stable—intermediates of the chemical dissolution process. Inoculation is by chemical dissolution of pure aluminum, and experiments have shown that it is possible to conveniently dissolve between 0.5 g and 17.5 g of aluminum per liter. Smaller quantities do not have the desired effect and larger quantities lead to no improvement, but increase the material costs. The lower the amount of dissolved aluminum, the slower the etching will proceed. As a good compromise between cost and process speed, and as optimal for the uniformity of the etch, it is preferred to dissolve 2 g to 2.5 g of aluminum per liter of hydrochloric acid for inoculation. For inoculation, advantageously some of the aluminum fragments can be used, which are also provided for the subsequent surface structuring. In this case, the skilled person will take into account that the aluminum content of an alloy can be significantly reduced, and it will accordingly increase the amount for vaccination.

After inoculation of the hydrochloric acid solution, an etching solution with temporally unstable ingredients is provided. It is as such ready to use and should be used immediately; this composition is not storage stable. "Immediate" means "as fast as possible", i.e. any process-related delays—e.g. to move the trough or vat, among other things—are possible, but the ongoing degradation of the unstable ingredients must be taken into account. The user may need to use more aluminum for vaccination to "buy" the time required to add the fragments to be etched.

After adding the aluminum fragments to the etching solution, a uniform etching attack on the fragment surfaces immediately starts. The etching solution is continuously circulated during the etching, for example with a magnetic stirrer. It has been shown experimentally that a removal of the reaction products caused by the flow of the etching solution is necessary in order to limit the self-reinforcing process of the dissolution, which leads to an unwanted electropolishing. At the same time, all surfaces of the aluminum fragments are to be etched so that they must not remain on the bottom of the etching trough or vat. The circulation is therefore set up such that the flow of the etching solution entrains the fragments and keeps them in continuous motion. In the simplest case, this can be achieved by a sufficiently high number of revolutions of the magnetic stirrer.

The etching of the aluminum fragments is preferably carried out with circulation of the etching solution for a time between 0.5 and 10 minutes, for example, and preferably for 4 to 5 minutes. Very short etching times are associated with high hydrochloric acid concentration and a more difficult process control. In particular, the subsequent etch stop becomes more complicated and more expensive. Etching beyond 10 minutes is not recommended, because in addition to a low yield per time even a fast-aging etching bath with changing ingredients must be accepted.

The etching method is stopped according to the invention in the etching solution by diluting the hydrochloric acid by means of flooding with fresh water. The flooding and dilution of the hydrochloric acid should take place within a few seconds, while the diluted etching solution is circulated further along with the fragments. After that, the etched fragments are removed from the etching bath, rinsed several times with water and finally with an organic drying agent, for example acetone or isopropanol.

The thus-produced, etched aluminum fragments are storage stable and usually have anchoring structures on the entire, but at least predominant, portion of their exposed surface, which have hitherto been seen only on large etched aluminum surfaces. The anchoring structures are formed from deeply etched, irregular pores and the remaining, usually scrambled, residual structures between the pores. The penetration depth of the deepest etched pore relative to the highest elevation of a residual structure after the etch attack is typically in the interval between about 20 and 50 microns.

According to the invention, the local and temporal composition of the etching solution for the success of the surface etching is of crucial importance. This composition is determined not only by a thermodynamic equilibrium concentration, but also by the local kinetics of the etching process and by the temporal degradation of unstable—transient—intermediates. Therefore, the useful composition can not be achieved only by the mere stirring of an etching solution. Rather, their flow and their aging—within minutes—play a role.

By means of suitable recharging, the concentration of the etching solution can also be kept constant in a continuous process, wherein the concentration of transient reaction products necessary for the autocatalytic reaction can remain high enough. The putting in and taking out of the aluminum fragments to be etched must be time-critical, whereby the etching must be stopped fast enough, for example, by very rapid immersion in pure water.

The aluminum fragments etched in accordance with the invention show the same shape as before the etching and in the method essentially retain their smallest structural widths. However, they are characterized by an extremely rough surface.

In the following, embodiments of the invention will be described in detail with reference to the accompanying drawings in the description of the figures, which are intended to illustrate the invention and are not to be considered as limiting:

In the drawings:

FIG. 5 *a*) a braid of modified aluminum wire—here: alloy AlMg5—with a wire diameter of just over 100 microns and FIG. 5*b*) an irregularly shaped aluminum fragment—here: Al 99.7%—with etched surface and a smallest structure width of a few 100 microns.

FIG. 11 *a*) to *c*) a prefabricated thermoplastic polyoxymethylene (POM) sheet which has been partially melted by heating the surface in the center and sprinkled with etched particles and tested accordingly.

FIGS. 1 to 4 were initially discussed in the description of the prior art to illustrate the shape and manufacturability of anchoring structures on various aluminum alloys.

Figure 5:
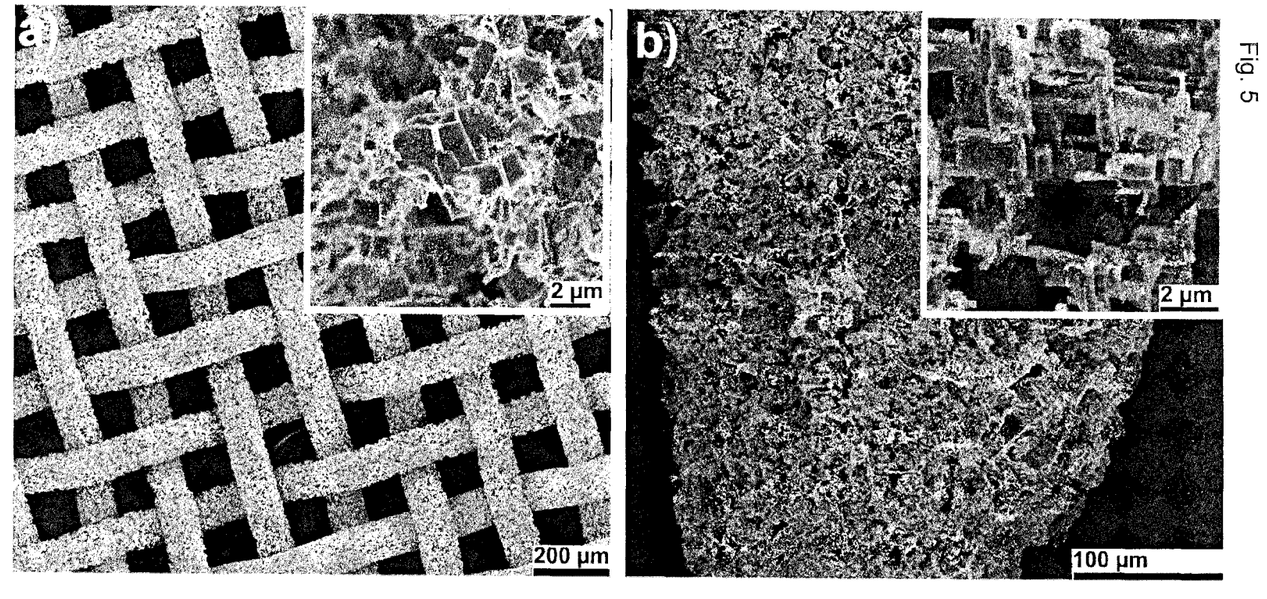

From FIG. 5 is now well visible that even the etching attack according to the invention with hydrochloric acid leads to such anchoring structures on the aluminum fragments. In this case, the etching surrounds each individual fragment with a sheath with extreme surface roughness, which comprises densely located pores provided with undercuts and angled portions. The thickness of the sheath corresponds to the depth of the etched pores or the length of the angled residual structures.

The sheath encloses the fragment, but it does not have to completely cover it. In fact, the acid attack will take place on all exposed surfaces of the fragment, but in particular it is also possible to provide a long wire with anchoring structures and to divide this after the etching into a plurality of wire filaments. The individual filaments then have no anchoring structures on their cut surfaces, which, however, can only be detrimental if the non-etched surfaces exceed in magnitude the etched surfaces of the filaments. This will usually be avoided and can be achieved by leaving the filaments long enough.

FIG. 5 a) shows a wire mesh of AlMg5 wires, which have been added to the etching bath in the already braided form. Before etching, the wires had a wire diameter—in this case: structure width—of more than 100 micrometers and, after the etching, had anchoring structures covering every originally free surface of the mesh.

FIG. 5 b) shows a corresponding etching result for a coarse-spherical fragment whose smallest structure width can be identified here with its smallest diameter of a few 100 micrometers. The inlays in FIGS. 5 a) and b) each show detail enlargements.

It will be readily understood that blending anchored-structure aluminum bodies with a first flowable and subsequently hardening material after curing will result in a composite which in any event can not be destroyed or decomposed by a failure of the aluminum to adhere to the material. Rather, it is necessary to accomplish either a cohesive failure of the material, such as a polymer, or the breaking of the fragment or both.

For experimental verification, the inventors have, inter alia, incorporated etched fragments of aluminum granules with several 100 microns grain diameter in flowable polymer precursor—polythiourethane (PTU) and polydimethylsiloxane (PDMS)—and poured several test strips of the same size. The aluminum filling levels of the composites are each about 20% to 30%. After curing of the polymers, the tensile strength of the strips was measured. In all cases, the strips were finally ruptured and also inspected for PTU under the electron microscope.

Figure 6:
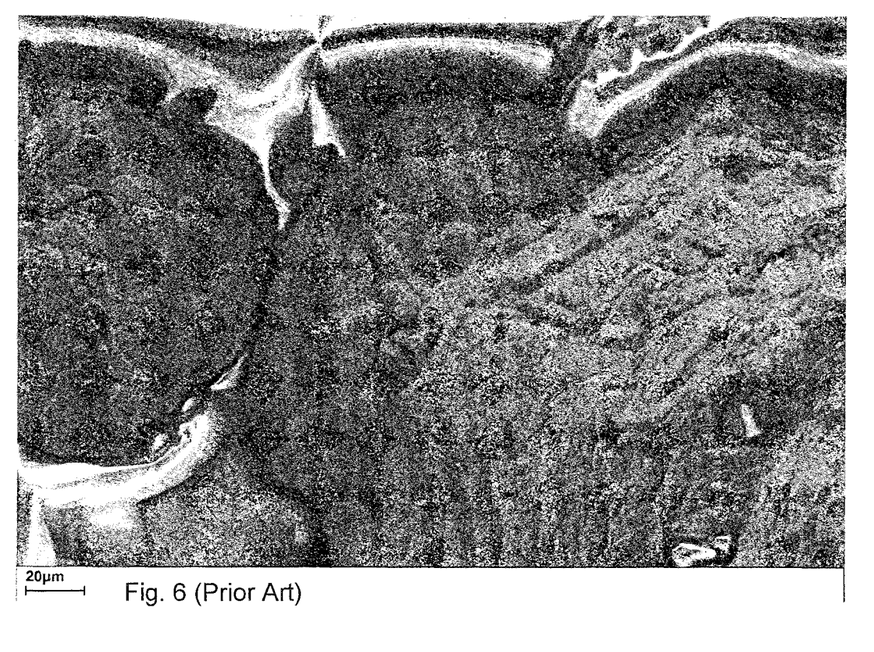
FIG. 6 a crack surface by a composite containing aluminum fragment embedded in a polymer (here: polythiourethane, PTU) after a tensile test (prior art)

By way of example, FIG. 6 shows the crack surface of a test strip in which PTU has been mixed with untreated aluminum granules. This corresponds to a variation of the proposal of GB 791,653 when resin is replaced by PTU, and is to be considered here as an example of the prior art. The crack surface shows that the aluminum fragments are undamaged and that the polymer has been cleanly removed from the aluminum surface to a large extent. The adhesion of the PTU to the aluminum has apparently failed, thereby initiating the overall tear of the test strip.

Figure 7:
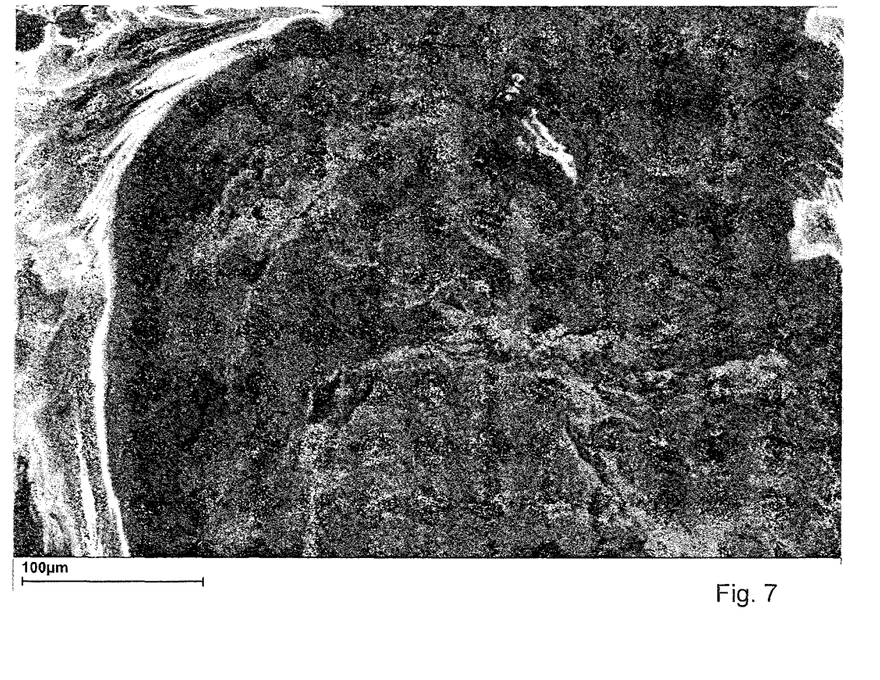
FIG. 7 a crack surface by a composite as in FIG. 6, now with etched aluminum fragments, which break with the tensile test.

In contrast, the aluminum fragments etched according to the invention have been torn after tearing off the test strip containing them, as shown in FIG. 7. The sharp-edged, rugged surface of the broken aluminum body differs significantly from the rather wavy and rounded surface of the intact granule grain in FIG. 6.

Figure 8:
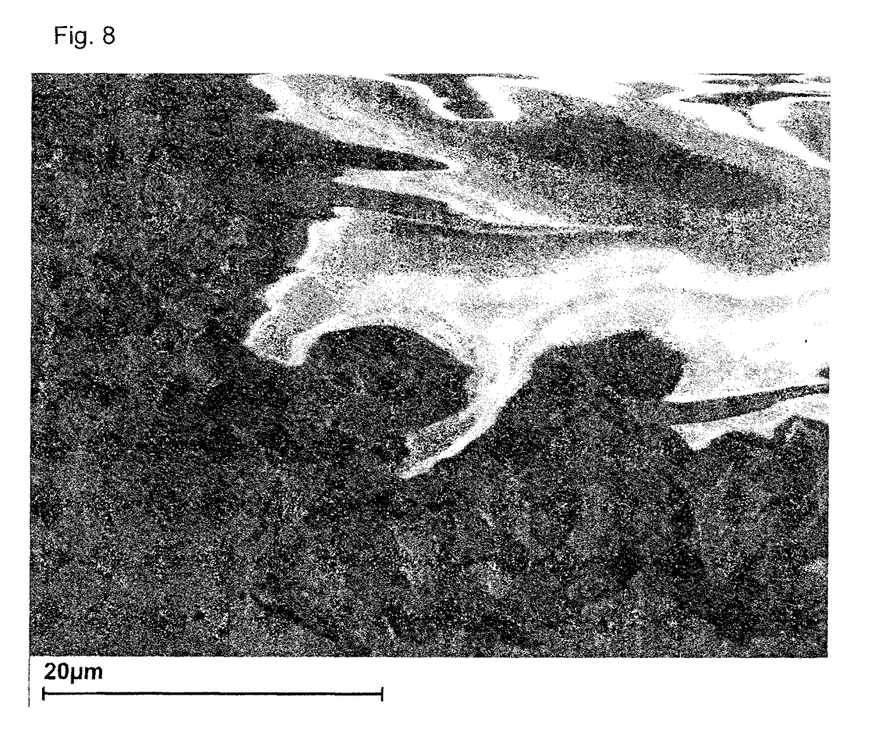
FIG. 8 the same crack area as in FIG. 7 elsewhere and enlarged, where the enclosing of the anchoring structures by the PTU is visible.

At some points of the crack surface, one can also recognize the mechanically robust positive connection between the PTU and the aluminum fragment with anchoring structures, for example, as shown in FIG. 8.

Figure 9:
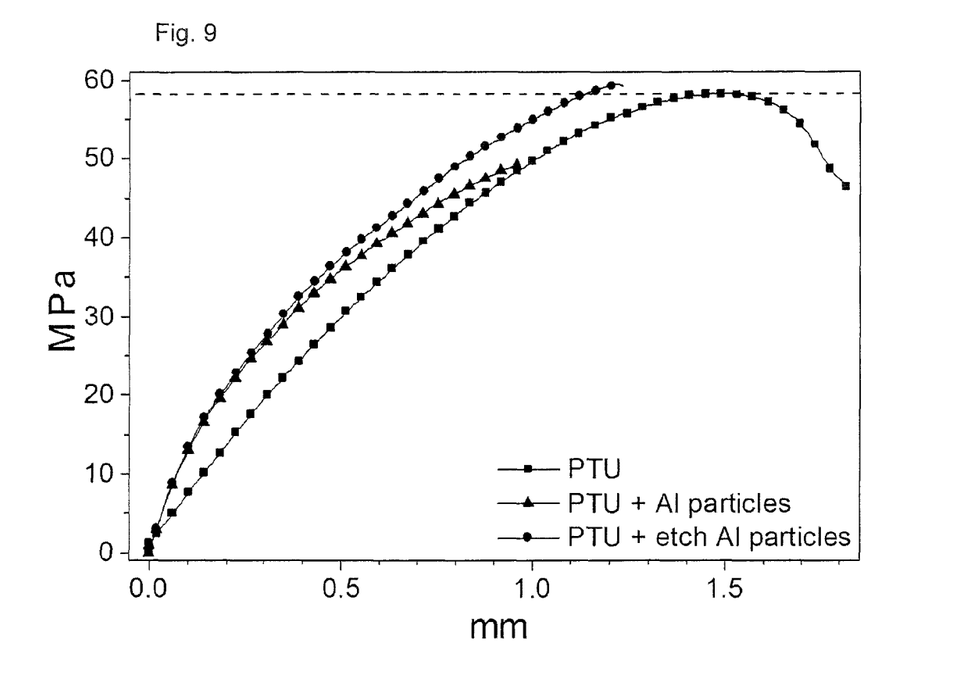
FIG. 9 the tensile test data for the composites of FIGS. 6 to 8 compared to a pure PTU sample.

In FIG. 9, the measurement results for PTU is shown in a tensile stress-strain diagram. The composites show from the beginning a significantly increased tensile strength compared to the pure PTU. While the pure polymer can be stretched more or less elastically up to a tensile stress of about 58 MPa and then irreversibly deformed (cohesive limit), such deformation is not available to the composites—instead they break off abruptly. Although the composite with untreated aluminum granules proves to be more tensile—in accordance with the teaching of GB 791,653—for lower tensile stresses, but fails due to the moderate adhesion of the PTU on aluminum already below 50 MPa. In contrast, in the composite with etched fragments, no adhesion failure occurs; it shows superior tensile strength up to about 60 MPa and is destroyed only by breaking the fragments.

Figure 10:
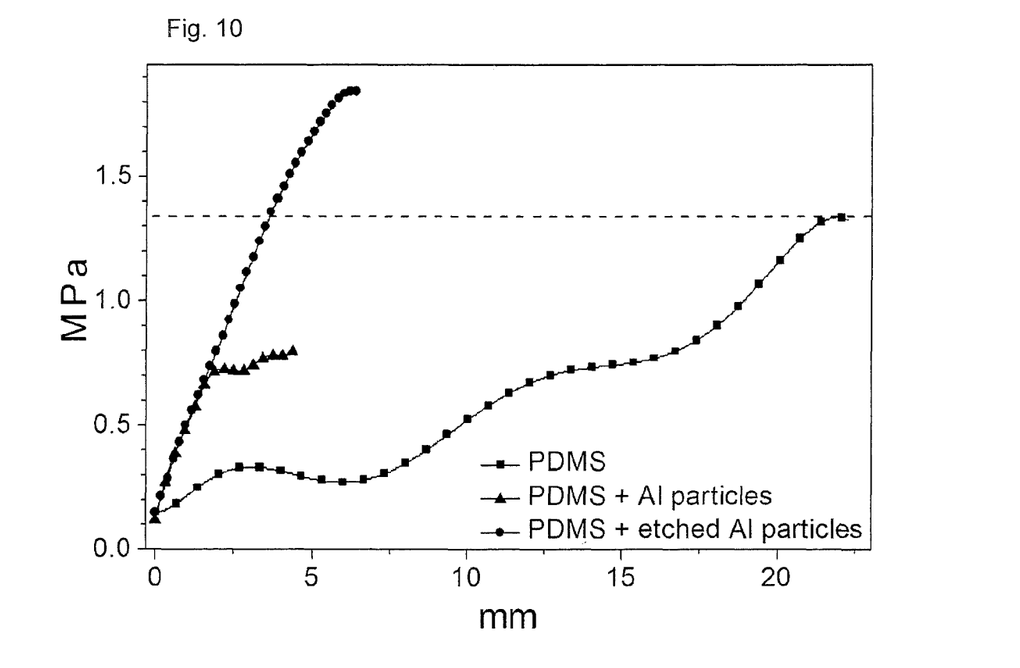
FIG. 10 pure polydimethylsiloxane (PDMS) tensile strength measurements and PDMS composites containing untreated and etched aluminum fragments.

For the more elastic and less tensile polymer PDMS (useful as a medical grade silicone), the effects of the aluminum fragments are on trend identical, but much more pronounced, as can be seen in the tensile stress strain diagram in FIG. 10.

It is noteworthy that the upper limit of the elastic elongation of the pure polymer, especially in the case of PDMS, can very clearly be exceeded. This suggests that the polymer matrix is locally relieved of tensile stress by the fragments. This in turn suggests that the concrete shape of the fragments may have an impact on the measurement result, especially if it contributes to an efficient distribution of force in the environment. A particularly advantageous form for the fragments is therefore seen in the tetrapod shape, also known as "foot fishing" or "crow's feet". Accordingly, wire bundles formed from aluminum wire fragment, for example, from two equal length wires, are inexpensive to produce and readily equipped according to the invention with anchoring structures.

The use of the etched fragments is not limited to polymers.

For example, the initially flowable and thereafter curing material may be a precursor for a sol-gel method for producing ceramic layers. Such precursors cure by a thermal sintering step at typical temperatures of about 100° C. to drive off the organic solvents. The aluminum fragments with the enclosing sheath with anchoring structures can withstand such temperatures without damage. They will also—soon after the production and removal of the etched fragments from the etching solution to the air—be very quickly covered with a few nanometer thick layer of aluminum oxide and thereby further passivate chemically.

In the following some composite materials according to the invention are presented, which may result from a certain type of use of modified aluminum fragments.

Example of Use "Cold Casting of Electrically Conductive Castings"

Preferably, small balls made of aluminum, whose surfaces are equipped with anchoring structures, can be placed in a largely arbitrary casting mold, where they—possibly after some shaking of the mold—compact into a spherical packing. The intermediate spaces can be impregnated with an initially flowable—preferably low-viscosity—polymer precursor, for example with a polyurethane or polymethyl methacrylate or polyethylene. After curing of the polymer, the modified aluminum spheres with diameters between 100 microns and more than one centimeter, preferably between 0.5 and 5 millimeters, are only separated from each other with rupture of the polymer. At the same time, the molded body is completely electrically conductive, since the balls were in conductive contact from the beginning and thus fixed. It has formed a percolating, electrical network. It is of particular advantage to use balls with a relatively large diameter, for example greater than 0.5 millimeters, since this forms a coherent, open pore space in the spherical packing, which is very easily permeated by the polymer precursor and can be filled up.

Such a molded body can be formed at room temperature—that is, without significant energy input at the place of casting—in any size and shape. It essentially has the mechanical strength of the polymer and the electrical conductivity of aluminum. The degree of aluminum filling of a conductive composite is usually above 50%.

Usage Example "Pegging"

Materials which either intrinsically adhere weakly to one another, e.g. silicone and PTFE, or which, although exhibiting some adhesion, tend to separate from one another as a result of very different thermal expansion during thermal cycling, can be described as incompatible when used as composite materials. Nevertheless, such material systems can be firmly mechanically connected to one another, so to speak "pegged", by holding bodies along their boundary surface. For this, however, it is necessary that the incompatible materials to be joined in the production of the composite material can both be provided in initially flowable and subsequently curing phases. Holding bodies with anchoring structures are each partially anchored with one of the two materials and then the two materials are held together continuously by their own structure. Suitable holding bodies may be aluminum wire filaments, for example in cylindrical or rectangular form, with the surface modification according to the invention. These can be applied or sprinkled onto a first material which is flowable at least in the area of its surface, whereby a part of the anchoring structures is already penetrated by the flowable phase. Once this hardens, the holding bodies are very firmly connected to the first material. This itself now carries practically anchoring structures for the second material, namely specifically on the still free surfaces of the holding body embedded only partially in the first material.

The fact that the holding bodies are not completely submerged in the flowable phase of the first material can be most easily prevented by precisely predetermining the layer thickness of the flowable phase—for example, as a function of time in a polymer extrusion—and then applying holding bodies at the desired time which are just too big to be completely immersed. This is an important difference from similar anchoring proposals in the prior art in which nano- to microparticles are to be used for anchoring. Their degree of embedding is fundamentally uncertain, and the "amount of anchoring possibilities" provided there for the second material is uncertain. When using aluminum fragments, however, high security can be ensured over the surface with anchoring structures which the second material can use for fastening.

Figure 11:
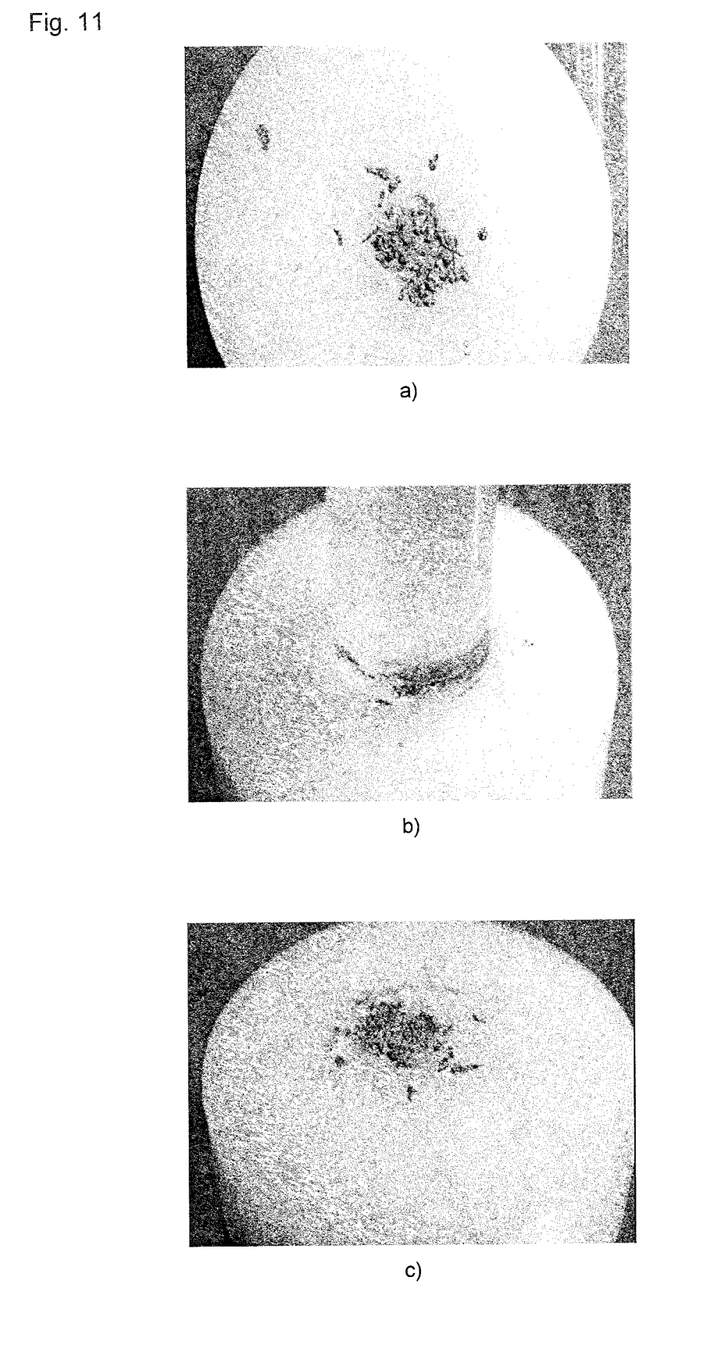

In FIG. 11 a) a prefabricated disc of thermoplastic polyoxymethylene (POM) is shown, which has been partially melted by heating the surface in the middle and sprinkled with etched fragments. The fragments were additionally pressed into the soft POM. After re-solidification of the POM a cylinder of ethylene vinyl acetate (EVA) is thermally softened on a top surface and pressed with the soft side on the partially embedded in POM fragment until the EVA is solidified again.

The composite thus formed, seen in FIG. 11 b), is torn apart in the subsequent tensile test, and it is found that the EVA fails cohesively just above the aluminum fragments.

The holding bodies remain wrapped in polymer on the POM disk, as shown in FIG. 11 c).

Furthermore, composite materials of a brittle ceramic, for example of lead zirconate titanate (PZT), and a soft elastic polymer, such as silicone, can be prepared by, for example, arranging on a PZT workpiece, a sol-gel film of a PZT precursor with predetermined film thickness, wherein aluminum fragments, whose smallest feature width is greater than the sol-gel film thickness, are applied to the sol-gel film and embedded in these. After the heat treatment for pyrolysis of the sol-gel film, the PZT workpiece exhibits on the treated surface tightly bound fragments with anchoring structures towards the outside, onto which silicone can "hold on" in an outstanding manner.

It should be emphasized here that the anchoring structures of the aluminum fragments have a certain flexibility and resilience to force attacks due to their filigree, coral-like structure. Force attacks on the holding body itself are thereby somewhat buffered, i.e. attenuated. Two materials with very different coefficients of thermal expansion can easily remain joined even under high temperature fluctuations if their cohesion is based on common anchoring to the same fragments with such anchoring structures, because they act as retaining bolts or dowels which can not be removed as long as the materials themselves do not fail structurally.

The invention claimed is:

1. An aluminum or aluminum alloy fragment etching method comprising the steps of:
   a. providing a hydrochloric acid solution having a concentration of 1.1 to 4.2 moles HCl per liter of water in a trough- or vat-shaped container;
   b. inoculating the hydrochloric acid solution by chemically dissolving a quantity of aluminum from the interval 0.5 g to 17.5 g per liter to produce an etching solution;
   c. adding aluminum or aluminum alloy fragments to the etching solution immediately after the inoculation;
   d. etching the aluminum or aluminum alloy fragments for 0.5 to 10 minutes while circulating the etching solution with the fragments such that the fragments are entrained by the movement of the etching solution to produce etched aluminum or aluminum alloy fragments;
   e. stopping the etching within a few seconds by diluting the etching solution with water;
   f. removing the etched aluminum or aluminum alloy fragments from the etching solution;
   g. repeatedly rinsing of etched aluminum or aluminum alloy fragments with water immediately after the removal and
   h. rinsing the etched aluminum or aluminum alloy fragments with an organic desiccant.

2. The etching method according to claim 1, wherein the hydrochloric acid solution has a concentration of 1.7 to 2.5 mol of HCl per liter of water.

3. The etching method according to claim 1, wherein the hydrochloric acid solution has a concentration of 2.1 mol of HCl per liter of water.

4. The etching method according to claim 1, further comprising seeding the hydrochloric acid solution by chemically dissolving 2 to 2.5 g of aluminum per liter.

5. The etching method according to claim 1, wherein the aluminum or aluminum alloy fragments are etched while circulating the etching solution with the aluminum or aluminum alloy fragments for 4 to 5 minutes.

6. An etched fragment made of aluminum or an aluminum alloy produced by the method according to claim 1, wherein the surface of the etched aluminum or aluminum alloy fragment has anchoring structures, wherein the shape of the fragment corresponds to its shape before the etching, wherein the fragment is a wire having a wire diameter of at least 50 micrometers and a length of at least 0.5 millimeter.

7. The etched aluminum or aluminum alloy fragment according to claim 6, wherein the etched aluminum or aluminum alloy fragment is a tetrapod.

\* \* \* \* \*